O. P. & L. W. BRIGGS.

Bung-Bushes.

No. 136,696.

Patented March 11, 1873.

Witnesses

Inventor
Orlando P. Briggs
Lewis W. Briggs
By Gridley & Warner
their Attys

UNITED STATES PATENT OFFICE.

ORLANDO P. BRIGGS AND LEWIS W. BRIGGS, OF CHICAGO, ILLINOIS, ASSIGNORS OF ONE-HALF THEIR RIGHT TO GEORGE W. GILLETT, OF SAME PLACE.

IMPROVEMENT IN BUNG-BUSHES.

Specification forming part of Letters Patent No. 136,696, dated March 11, 1873.

*To all whom it may concern:*

Be it known that we, ORLANDO P. and LEWIS W. BRIGGS, of Chicago, in the county of Cook and State of Illinois, have invented certain new and useful Improvements on Bung-Bushes, of which the following is a specification:

Our invention consists in providing a metallic bung-bush, having a circumferential flange fitting a corresponding recess cut in the stave around the bung-hole, with an annular bead upon the under side and around the outer edge of the flange. The bead enters a circular groove in the seat of the stave, and in screwing the bush home the raised seat between the bung-hole and said circular groove is compressed laterally between the bead and the body of the bush by the action of the unthreaded portion of the latter, crowding the wood outward. Thus a tight joint will be formed, even though the flange do not come in continuous contact with the seat, which continuous contact it is very difficult to obtain, as must be obvious to every practical man. The bore of bush is also provided with an inwardly-projecting lug at a point sufficiently low to admit of the insertion of the wooden bung above the lug, the latter being provided to enter a recess in the plug of a suitable wrench used in inserting the bush.

Figure 1:
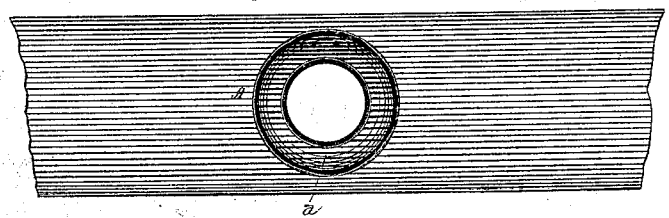
Figure 2:
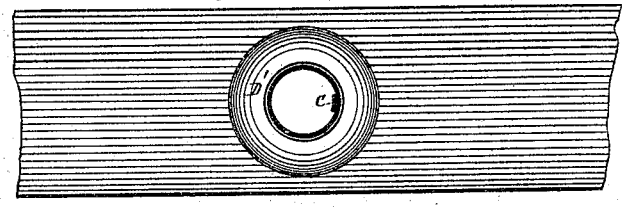
Figure 3:
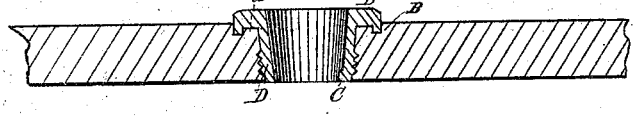
Figure 4:

Figure 1 illustrates in plan the bung-hole with the seat and groove around it ready for the reception of the bush. Fig. 2 is also a plan, showing the bush in position. Fig. 3 is a vertical section. Fig. 4 is an elevation of the bush detached.

The same letters of reference are used in all the figures in the designation of identical parts.

The body D of the bush has a screw-thread formed upon it below its circumferential flange D', and is made tapering both exteriorly and interiorly in the usual manner. The under side of the flange D' has an annular shoulder or bead, B, around its outer edge, adapted to enter a corresponding groove, A, cut in the stave around the circumference of the recess formed therein around the bung-hole for the reception of the flange D'. Thus a raised seat, *a*, extends around the bush between its body and the bead B, which will be crowded outward and against the bead on screwing the bush home by the unthreaded portion of the latter; this action being aided by the tapering form of the bush. It has been found in the practical application of this bush that in most cases an absolutely tight joint is formed between it and the stave without the use of packing; but to be certain of the attainment of such a joint in all cases a few drops of lead may be dropped into the threads of the bush previous to its insertion in the stave; the lead, being forced upward under the flange on screwing the bush into the stave, will hermetically seal every possible interstice. C refers to the inwardly-projecting lug upon the interior surface of the bush, located at or near the lower end thereof, as shown clearly in Fig. 3. Any wrench having a head fitting the bore of the bush and provided with a groove corresponding to the lug will be suitable for the purpose of inserting or removing the bush.

The wooden bungs now most generally used are so short or at least do not pass deep enough into the bush so as to be interfered with by this lug. Its provision in lieu of forming a slot, or even a groove, in the flange for interlocking with a projection on the wrench has this obvious advantage: it leaves the bush with unimpaired strength to withstand the rough usage to which it is subjected, and does not interfere with the packing quality of the flange, which is necessarily the most essential requisite of an effective and reliable bush. It may also be stated here that very considerable power is brought to bear upon the bush on inserting it in the stave, and that the power of withstanding successfully this strain is obviously much greater in our bush than in those alluded to.

What we claim as our invention, and desire to secure by Letters Patent, is—

1. A tapering bung-bush having a circumferential flange, D', with a downwardly-projecting annular bead, B, which, together with the tapering body D of the bush, act upon a raised seat, *a*, of the stave, substantially as and for the purpose specified.

2. The herein-described bung-bush, composed of the tapering body D, inwardly-projecting lug C, circumferential flange D', and downwardly-projecting annular bead B, substantially as specified.

ORLANDO P. BRIGGS.
LEWIS W. BRIGGS.

Witnesses:
N. C. GRIDLEY,
F. F. WARNER.